Aug. 29, 1933.　　　L. C. SHIPPY　　　1,924,260
CAM TESTING DEVICE
Filed May 29, 1930　　　3 Sheets-Sheet 1

Inventor
Leo C. Shippy
By Spencer Hardman & Fehr
his Attorneys

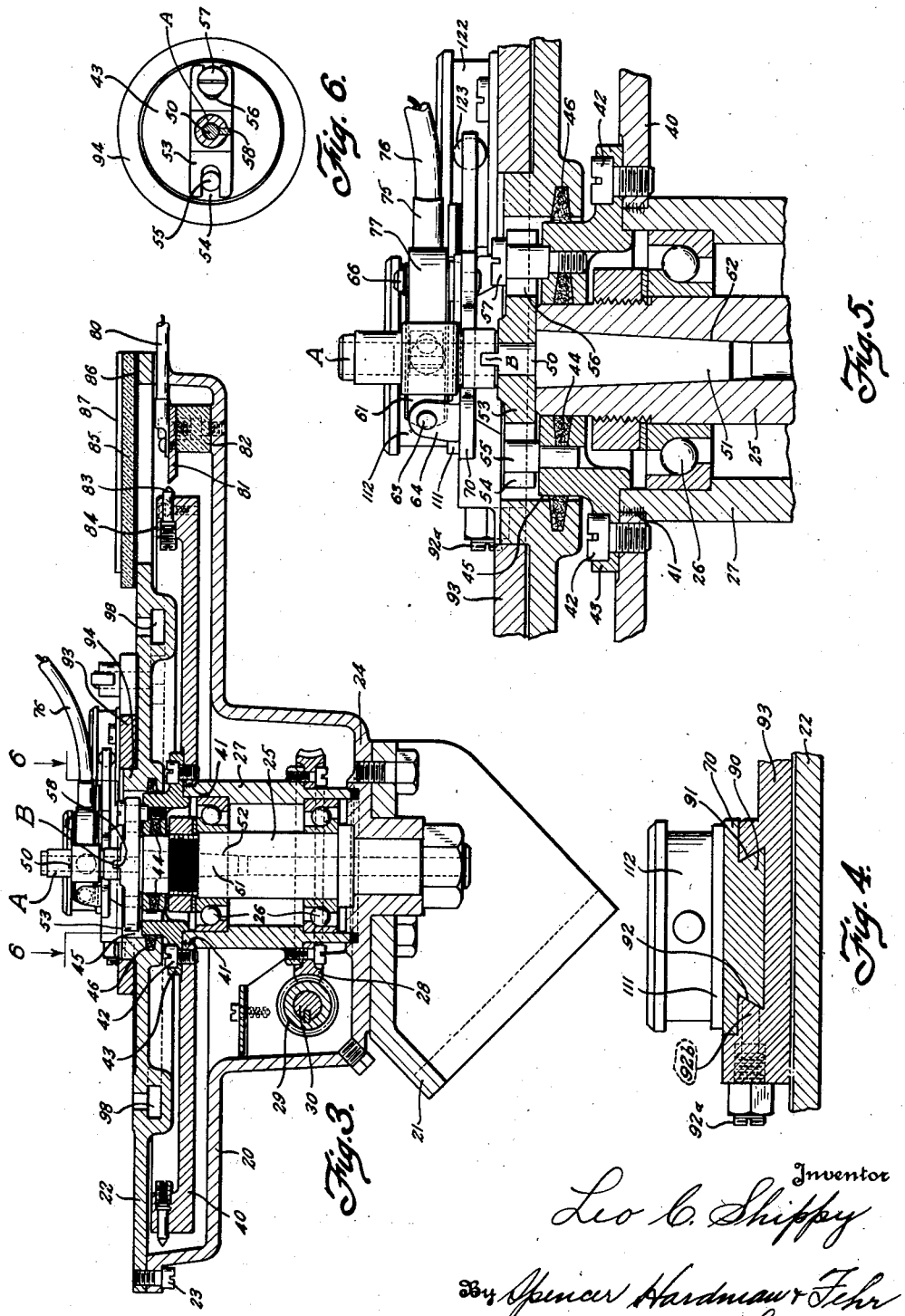

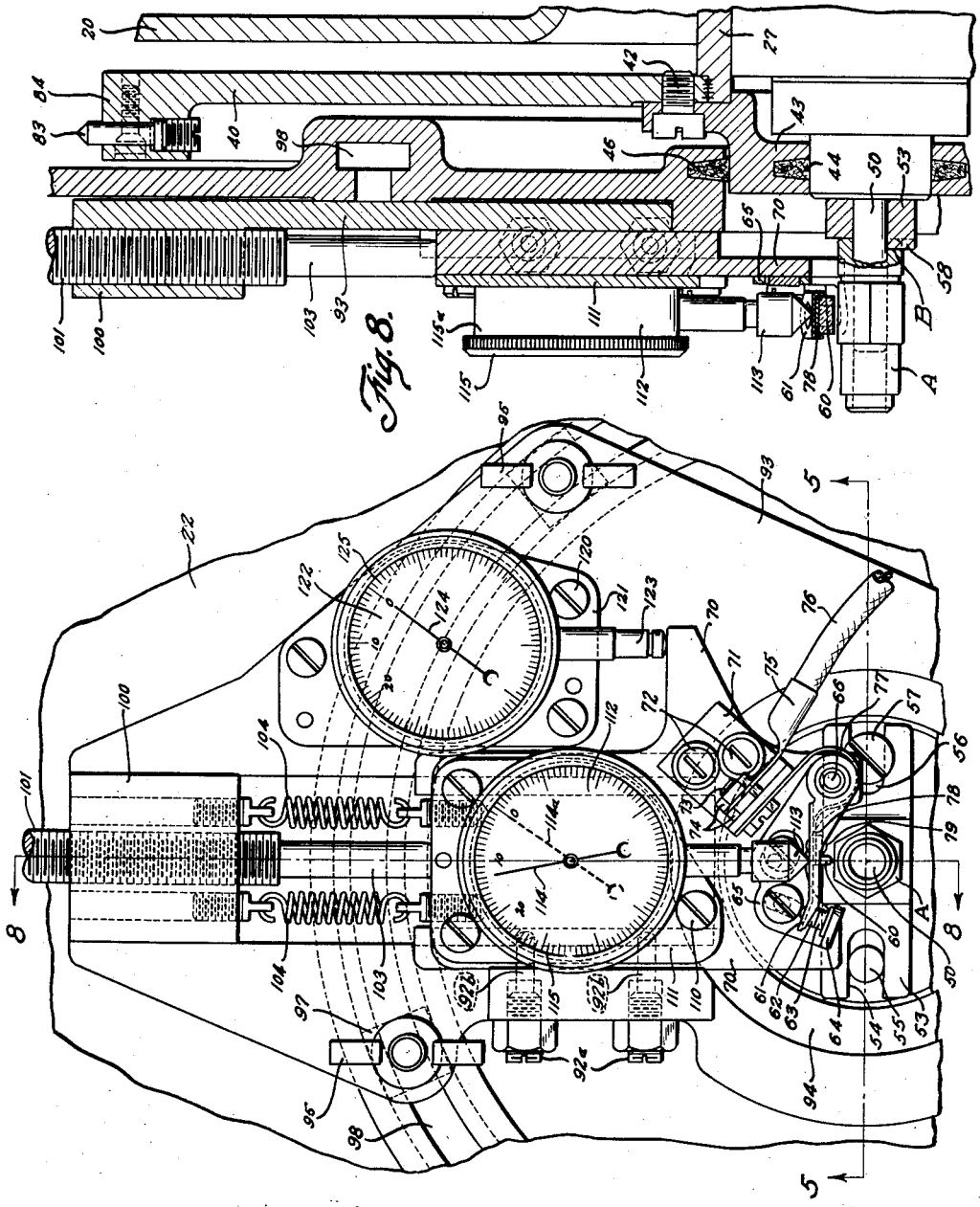

Patented Aug. 29, 1933

1,924,260

UNITED STATES PATENT OFFICE 1,924,260

CAM TESTING DEVICE

Leo C. Shippy, Anderson, Ind., assignor to Delco-Remy Corporation, Anderson, Ind., a Corporation of Delaware Application May 29, 1930. Serial No. 457,238

26 Claims. (Cl. 33—174)

This invention relates to the manufacture of cams and more particularly to cams for periodic circuit interrupters especially for ignition timers for internal combustion engines.

It has been the practice to grind the camming surface of an ignition timer cam on a machine having a swinging arbor controlled by a master cam which is several times larger than the cam to be produced and which has a contour not necessarily a large scale reproduction of the cam designed but which may be constructed according to dimensions arrived at by empirical formulæ using the actual dimensions of the cam designed as the basis of calculation. The accuracy with which ignition timer cams are produced by this method will depend on the accuracy of these calculations and the accuracy with which the master cam is made according to the calculation. This method may be generally satisfactory for ordinary ignition requirements. When unusual precision is required in the manufacture of cams especially for high speed multi-cylinder engines having for example sixteen cylinders, I have found it desirable to construct the master cam which controls the grinding machine for grinding production cams by actually generating the surface of the master cam on a precision grinding machine having a swinging arbor whose movements are controlled by a precision model cam constructed exactly according to the full scale dimensions prescribed by the cam designer. I believe that the latter method is more conducive to accurate production on a large scale than the former for the reason that the master production cam can be made more accurately when generated from the full scale precision model than when generated from calculations based on the dimensions of the cam designer. Furthermore, an accurate check or inspection of the cams produced by the latter method can be made since there is a precision model which will serve as a standard of comparison.

The object of the present invention is to provide an inspecting or testing device by which certain comparisons can be made between any production cam and the corresponding precision model.

Further objects and advantages of the present invention will be apparent from the following description, reference being had to the accompanying drawings wherein a preferred embodiment of one form of the present invention is clearly shown.

In the drawings:

Fig. 3 is a sectional view on line 3—3 of Fig. 1.

Fig. 4 is a sectional view on line 4—4 of Fig. 1 and is drawn to a larger scale.

Fig. 5 is a large scale sectional view of a portion of the device shown in Fig. 3. Fig. 5 is also a sectional view on line 5—5 of Fig. 7.

Fig. 6 is a sectional view on line 6—6 of Fig. 3.

Fig. 7 is a fragmentary plan view drawn to a larger scale than Fig. 1.

Fig. 8 is a sectional view on line 8—8 of Fig. 7.

Figures 1, 2:
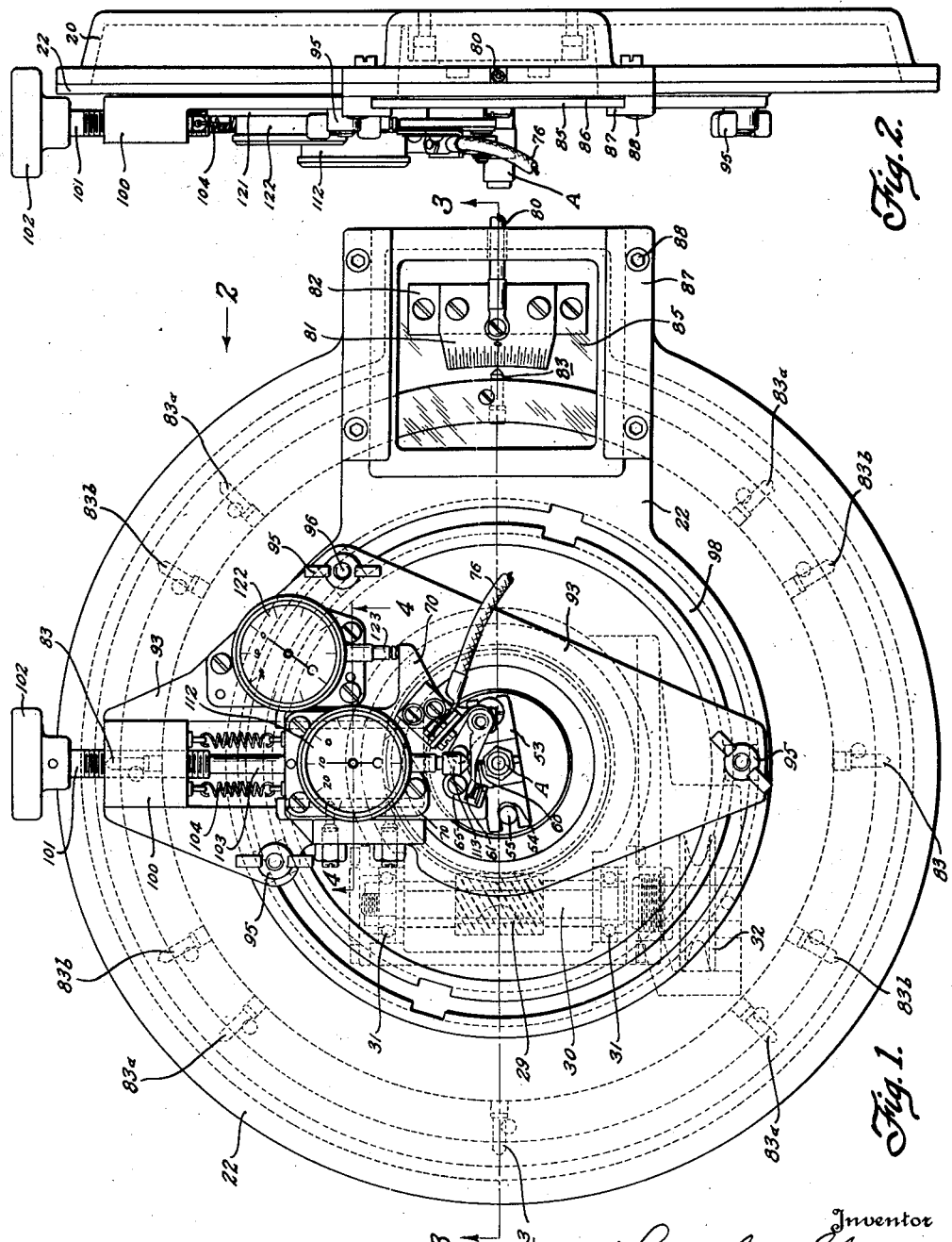
Fig. 1 is a plan view of a cam testing device constructed in accordance with the present invention.
Fig. 2 is a side view looking in the direction of arrow 2 in Fig. 1.

The testing device comprises a frame or case 20 attached to a suitable mounting bracket 21 and receiving a cover 22 attached by screws 23.

The bottom wall 24 of the case nonrotatably supports a stub shaft 25 surrounded by ball bearings 26 upon which a tubular hub 27 is journalled. The hub 27 carries a worm gear 28 driven by a worm 29 keyed to a shaft 30. Referring to Fig. 1, shaft 30 is journalled in ball bearings 31 supported by the housing 20, and one end of shaft 30 carries a pulley 32 by which the shaft may be driven by a suitable belt connected with the shaft of an electric motor (not shown).

The hub 27 carries a plate 40 which is preferably attached to the hub 27 by welding at 41. Screws 42 attach to plate 40 a collar 43 which carries internally a felt ring 44 bearing against the stub shaft 25 in order to exclude dust from the shaft bearings. The collar 43 extends into an opening 45 in the cover 22 which is provided with an annular felt ring 46 bearing against the outer cylindrical surface of the collar 43 for the purpose of excluding dust. The cam A to be tested is maintained in a position coaxial with the hub 27 by placing the cam over the end of a rod 50 which is ground to accurately fit the central bore of the cam. The rod 50 is detachably secured to the stub shaft 25 by providing the rod with a tapered shank 51 which may be pressed into a corresponding tapered bore 52 in the stub shaft 25. The cam A rests upon a driving plate 53 having a notch 54 which receives a pin 55 fixed to the collar 43 and having a notch 56 receiving a screw pin 57 which may be threaded into the collar 43 in order to prevent upward movement of the plate 53. The cam A of an ignition timer generally is provided with a notch B or its equivalent for providing means for accurately locating a distributor rotor in driving relation to the cam. Therefore, the driving plate 53 is provided with a lug 58 or other suitable part adapted to engage in the notch B. Every precision cam model will be provided with a corresponding driving plate 53 and a suitable locating pin 50 which serves as a bearing upon which the cam is rotated. It will be noted that the cam is rotated upon a fixed bearing and is merely driven by the part which rotates around the fixed bearing. Therefore, the cam is permitted to rotate as nearly as possible coaxially with the axis of its central bore and is unhindered in this manner of rotation by reason of the fact that the collar 43 might rotate slightly eccentrically with respect to the fixed bearing 50.

The cam A actuates a rubbing block 60 of a circuit breaker lever 61 which is preferably constructed like the circuit breaker lever of the ignition timer with which the cam is intended to be used. The lever 61 carries a contact 62 engageable with a contact 63 attached to an ear 64 extending upright from a bracket 65 which together with the lever 61 is pivoted upon a pin 66, the lever 61 being insulated from the pin 66 and bracket 65. The pin 66 is riveted to a plate 70 to which a bracket 71 is insulatingly attached by screws 72. Bracket 71 carries a terminal screw 73 which cooperates with nuts 74 to attach to the bracket 71 the terminal clip 75 of an insulated conductor 76 and a leaf spring conductor 77 which is bent around the hub of the lever 61 and has its end 78 attached to the lever 61 by a rivet 79 which is employed to attach the rubbing block 60 to the lever 61. The wire 76 is attached to one end of the primary winding of an ignition coil, the other end being connected with a battery which is grounded. The contact bracket 65 is connected with the battery through a ground connection including the frame of the testing device. When the contacts 62 and 63 are closed, current will flow through the primary circuit of an ignition coil in order to energize the coil. The non-grounded terminal of the secondary winding of the coil is connected by a wire 80 with a graduated sector 81 mounted on an insulating block 82 attached to the housing 20. When the energy of the coil is discharged by the separation of contact 62 from contact 63, this energy is dissipated as a spark which jumps from the plate 81 to certain pointed pins 83 detachably secured to the flange 84 of the rotating plate 40. These pins 83 are spaced in such a way that cams having four, six and eight lobes may be tested. Referring to Fig. 1, it is apparent that the pins 83 which are 90 degrees apart will cooperate with the sector 81 to conduct sparking impulses to ground when testing a four lobe cam. When testing an eight lobe cam, pins 83a will be operative in addition to those marked 83. When testing a six lobe cam pins 83b will be operative in addition to those pins which are marked 83. The jumping of the spark from a certain point or division of the scale on the sector 81 to one of the points 83 or 83a or 83b can be observed through a transparent window 85 which rests upon a sealing gasket 86 and is held in position by guiding plates 87 secured to the cover 22 by screws 88.

The plate 70 is provided with a guiding extension 90 dove-tail shaped in cross-section as shown in Fig. 4 and guided for radial movement relative to the axis of the cam A by ways 91 and 92 which are integral with a plate 93. Adjustment of the clearance between the dove-tail extension 90 and the ways 91 and 92 is made by turning screws 92a which force pins 92b against one side of the dove-tail extension. Plate 93 has a central opening which receives an annular flange 94 provided centrally of the plate 22. The flange 94 provides a bearing for the plate 93 so that the latter may be adjusted angularly with respect to the cover 22. This angular adjustment is necessary in order to bring certain of the points 83 adjacent the sector 81 at the time a sparking impulse occurs. As the angular location of the lobes of a cam A with respect to the plate 40 will depend upon the angular location of a locating notch 58 with respect to the cam lobes, it is evident that certain adjustments will be necessary in order to adapt the device for testing different types of cams. While the plate 40 is rotating and the cam A is operating the circuit interrupter for the purpose of producing sparking impulses in an ignition coil, the plate 93 is turned until a spark appears adjacent the zero mark on the sector 81. The plate 93 is then secured to the cover 22 in this position by tightening wing nuts 95 down against the plate 93. These wing nuts cooperate with threaded shanks 96 of bolts which pass through plane holes in the plate 93 and have square heads 97 received by the portion 98 of an annular groove which is T-shaped in cross section as shown particularly in Fig. 8.

The plate 93 is provided with a threaded boss 100 which receives a screw 101 which may be turned by a handle 102. The screw 101 includes a non-threaded extension 103 adapted to bear against the plate 70 which is urged against the extension 103 by each of two springs 104 attached to the plate 70 and to the boss 100. By turning the screw 101 the rubbing block 60 of the circuit breaker lever 61 is moved into or out of cooperative relation with the cam A. Screws 110 fasten to the plate 70 a plate 111 carrying an indicator gauge 112 having a feeler 113 operatively connected with a pointer 114 which points to divisions on a dial 115 graduated in one-thousandths of an inch. Screws 120 secure to the plate 93 a plate 121 carrying an indicator gauge 122 having a feeler 123 which operates a pointer 124 pointing to divisions on a dial 125 also graduated in thousandths of an inch.

The method of using this apparatus can be described more readily by reference to a particular cam chosen by way of example. This cam A may be a six lobe cam designed to produce .020" point opening. Before placing the precision model cam upon the spindle 50 a feeler strip or strip of sheet metal .020" in thickness is placed between the contact points 62 and 63. The screw 101 is turned until the gauge feeler 113 engages the lever 61. Then the dial 115 of the gauge 112 is turned so that the zero mark will be opposite the pointer 114 when in the broken line position 114a. Then the feeler strip is removed from between the contact points thus allowing the contact points to close and permitting the feeler 113 to move inwardly to the full line position 114. Since the gauge feeler 113 is closer to the pivot post 66 than the contact point 62, the pointer 114 will swing from zero to a scale division less than 20, for example, division 13 thus indicating that the movement of the lever 61 adjacent the rubbing block 60 is about .013". The precision model cam is placed upon the locating rod 50 with its locating notch received by the locating lug 58 of the driving plate 53. The precision model cam is turned until the rubbing block 60 rests upon the point of one of its lobes. The screw 101 is turned so as to adjust the gauge 112 to a position in which the pointer will point to zero on the scale 115 as indicated at 114a, the previous location of the dial 115 remaining unchanged. The dial 125 of the indicator 122 is then turned so as to bring the zero mark opposite the end of pointer 124. The precision cam is rotated and will cause the pointer 114 to swing exactly between the zero mark and the 13 mark on the dial 115. The plate 93 having been unclamped from the plate 22 by loosening the wing nuts 95, the assemblage of circuit breaker and gauges is turned about the axis of the cam until a spark is seen to jump the gap between the sector 81 and the points 83 and 83b in succession at the zero mark on the sector 81. The lobes of the precision model cam being equiangularly spaced, a spark will be seen at the zero mark each time the circuit breaker points are opened.

A production model cam A is then substituted for the precision model upon the locating rod 50. The cam A is then turned until the rubbing block 60 of lever 61 rests upon one of its lobes. If this cam has the proper outside diameter the pointer 114 will point to zero on the scale 115 just as it did when the precision model was located in this position. If the pointer 114 does not point to zero the screw 101 is turned until it does point to zero. The turning of screw 101 causes the pointer 124 to move away from the zero mark on scale 122, and the reading of scale 122 indicates in thousandths of an inch to what extent the cam lobe outside radius varies from the prescribed dimension. If the points of the cam lobes are equidistant from the axis of rotation the pointer 114 should swing back to the zero mark on 115 each time the lobe of the cam A engages the rubbing block 60. If the pointer 114 swings to divisions on either side of the zero mark as the various cam lobes engage the rubbing block, this is an indication that the cam is eccentric with respect to its axis, that is, the points of the cam lobes are not equidistant from the axis. The amount of deviation of the pointer 114 from the zero mark indicates the amount of eccentricity of the cam A.

Although the lobes of the cam may be concentric with the axis of the cam and may have the correct outside radius, these lobes may not be equiangularly spaced thus effecting separations of the contact points at unequal intervals. If the cam lobes are equiangularly spaced, the spark would be visible at the same indicating mark on the sector 81 each time the cam effects the separation of the contact points 62 and 63. If the locating notch B in the production cam A has been located properly with respect to the cam lobe, the spark will appear at the zero scale mark on sector 81. If the spark appears on either side of this zero mark, this will indicate the extent of error in locating the notch B. If there is an error the reading of the sector scale can be taken and the plate 93 turned so as to cause the spark to appear at the zero mark of the sector 81. If the lobes of cam A are not equiangularly spaced, the spark will appear to occur not always on the zero mark but sometimes on the one side thereof or the other. The deviation in the reading of the sector scale from the zero mark thereon will indicate the extent to which the cam lobes are unevenly spaced or the extent to which a circuit breaker operated by the cam A would be out of synchronism with a predetermined series of contact openings.

From the foregoing description of the construction and mode of operation of the testing apparatus it is apparent that a cam may be quickly tested for outside radius of its cam lobe, eccentricity of the cam lobes with respect to the axis of rotation, synchronism of contact separations effected by the cam, and correctness of location of the cam lobes with respect to the locating notch B or any equivalent device which is employed for locating the distributor rotor upon the cam and drivingly connecting the same with the cam. The apparatus provides also a test for minimum inside diameter of the cam. The rod 50 has the same diameter as a shaft of the ignition timer upon which the cam is located. If the cam to be tested will not fit over the rod 50 it must be rejected for having a central bore which is less than the required diameter. This testing device indicates both the manner in which the production cam is inaccurate and the extent of inaccuracy. The information obtained from this testing device is useful in checking against the master production cam of the precision model cam in order to determine how the inaccuracy arose.

While the form of embodiment of the present invention as herein disclosed, constitutes a preferred form, it is to be understood that other forms might be adopted, all coming within the scope of the claims which follow.

What is claimed is as follows:

1. A testing device for ignition timer cams comprising, in combination, means for supporting a cam for rotation about its own axis, means for driving the cam, a circuit breaker including a lever and cooperating contacts adapted to be operated by the cam, a movable plate carrying the circuit breaker for bodily movement relative to the cam, means for indicating movement of the lever required to separate the contacts, and means for indicating bodily movement of the circuit breaker relative to the cam.

2. A testing device for ignition timer cams comprising, in combination, means for supporting a cam for rotation about its own axis, means for driving the cam, a circuit breaker including a lever and cooperating contacts adapted to be operated by the cam, a plate supporting the circuit breaker, a second plate supporting the first plate and guiding the latter for movement radially of the cam, means for adjusting the first plate relative to the second plate, a gauge for indicating relative movement between the plates, and a gauge attached to the first plate for indicating movement of the lever relative thereto.

3. A testing device for ignition timer cams comprising, in combination, means for supporting a cam for rotation about its own axis, means for driving the cam, a circuit breaker including a lever and cooperating contacts adapted to be operated by the cam, a main frame supporting the cam support and driving means, a distributing plate for sparking impulse current operated by said cam driving means and rotating substantially coaxially with the cam and carrying pointed conductors, a graduated sector plate carried by the frame and cooperating with said pointed conductors to indicate spark position, a plate supporting the circuit breaker, a second plate supporting the first plate and guiding the latter for movement radially of the cam, and supported by the frame for angular adjustment coaxially with respect to the cam, means for securing the second plate to the frame in various positions of angular adjustment, means for adjusting the first plate relative to the second plate, a gauge for indicating relative movement between the plates, and a gauge attached to the first plate for indicating movement of the lever relative thereto.

4. A testing device for ignition timer cams, comprising, in combination, means for supporting and driving a cam about its own axis, a circuit breaker having cooperating contacts and a movable cam operated member for separating the contacts, a movable plate carrying the circuit breaker for bodily movement relative to the cam, means for indicating the movement of the member to effect a predetermined separation of the contacts, means for bodily adjusting the circuit breaker relative to the cam to effect a predetermined separation of the contacts by the cam being tested, and means for indicating bodily movement of the circuit breaker.

5. A testing device for ignition timer cams comprising in combination; means for supporting the cam for rotation about its own axis, means for driving the cam, a circuit breaker including a lever in cooperating contact with and adapted to be operated by the cam, a main frame supporting the cam support and driving means, a plate supporting the circuit breaker, a second plate radially adjustably supporting the first plate with respect to the cam and being movable relative to the supporting main frame, means for securing the second plate to the main frame in any adjusted position, a gauge for indicating relative movement between the plates, and a gauge attached to the first plate for indicating movement of the lever relative thereto.

6. A testing device for ignition timer cams comprising in combination; means for supporting and driving a cam about its own axis, a circuit breaker having cooperating contacts and a movable cam operated member for separating the contacts, a movable plate carrying the circuit breaker for bodily movement relative to the cam, means for indicating the movement of the member required to effect a predetermined separation of the contacts, means for bodily adjusting the circuit breaker relative to the cam to effect a predetermined separation of the contacts by the cam being tested, means for indicating such bodily movement of the circuit breaker, a spark timing indicator comprising a distributor member located coaxially of the cam and a supporting member, a pointed conductor carried by one of said members, a graduated sector plate carried by the other member, and means effecting relative movement between the pointed conductor and the sector plate in response to the movement of the cam.

7. A testing device for ignition timer cams comprising, in combination, means for supporting and driving a cam about its own axis, a circuit breaker having cooperating contacts and a movable cam operated member for separating the contacts, a movable plate carrying the circuit breaker for bodily radial movement relative to the cam, means for indicating the movement of the member relative to the plate to effect a predetermined separation of the contacts, means for adjusting the plate relative to the cam to effect a predetermined separation of the contacts by the cam being tested, means for indicating movement of the plate, a spark timing indicator comprising a distributor plate rotatable coaxially with the cam and carrying pointed conductors and a stationary graduated sector plate cooperating with said pointed conductors, and means for angularly adjusting the movable plate relative to the cam.

8. In a testing device for ignition timer cams, the combination of means for supporting a cam to turn about its own axis, a circuit breaker adapted to be operated by the cam, means for indicating sparking timing and including a distributor plate carrying pointed conductors cooperating with a stationary graduated sector plate, said distributor plate rotating coaxially with the cam, means for driving the cam, said driving means including means for synchronizing the cam action with the passing of a conductor by a marked point on the sector plate, means for moving the circuit breaker concentrically of the axis of the cam into any desired angular position relative thereto, and means for arresting the circuit breaker in any desired angular position relative to the cam.

9. A testing device for ignition timer cams comprising, in combination, means for supporting and driving a cam about its own axis, a circuit breaker having cooperating contacts and a movable cam operated member for separating the contacts, a movable plate carrying the circuit breaker for bodily radial movement relative to the cam, means for indicating the movement of the member relative to the plate to effect a predetermined separation of the contacts, means for adjusting the plate relative to the cam to effect a predetermined separation of the contacts by the cam being tested, means for indicating movement of the plate, a spark timing indicator including an index member and a scale member one of which is stationary and the other rotatable coaxially with the cam, and means for angularly adjusting the plate relative to the cam.

10. In a testing device for ignition timer cams, the combination of means for rotatably supporting a cam to turn about its own axis, a circuit breaker having cooperating contacts and a movable cam operated member for separating the contacts, a spark timing indicator including an index member and a scale member one of which is stationary and the other rotatable coaxially with the cam, means for driving the cam, said driving means including means for synchronizing the cam action with the relative passing of the index member by a marked point on the scale member; and means for angularly adjusting the circuit breaker relative to the cam.

11. A testing device for ignition timer cams comprising, in combination, a stationary shaft providing a bearing upon which the cam rotates, a circuit breaker having cooperating contacts and a movable cam operated member for separating the contacts, a spark timing indicator including an index member and a scale member one of which is stationary and the other rotatable coaxially with the cam, means for synchronizing the cam action with the relative passing of the index member by a marked point on the scale member, means for driving the cam including a rotary shaft journaled on the stationary shaft, a driving member attached thereto and the synchronizing means, and means for angularly adjusting the circuit breaker relative to the cam.

12. A testing device for ignition timer cams comprising, in combination, a stationary shaft providing a bearing upon which the cam rotates, a circuit breaker having cooperating contacts and a movable cam operated member for separating the contacts, a movable plate carrying the circuit breaker for bodily radial movement relative to the cam, a spark timing indicator including an index member and a scale member, one of which is stationary and the other rotatable coaxially with the cam, means for synchronizing the cam action with the relative passing of the index member by a marked point on the scale member, means for driving the cam including a rotary shaft journaled on the stationary shaft, a driving member attached thereto and the synchronizing means, means indicating the movement of the circuit breaker member relative to the plate to effect a predetermined separation of the contacts, means for adjusting the plate relative to the cam to effect a predetermined separation of the contacts by the cam being tested, means for indicating movement of the plate relative to the cam, and means for angularly adjusting the plate relative to the cam.

13. In a testing device for ignition timer cams, the combination of means for supporting a cam to turn about its own axis, a circuit breaker adapted to be operated by the cam, means for indicating sparking timing and including a distributor plate carrying pointed conductors cooperating with a stationary graduated sector plate, said distributor plate rotating coaxially with the cam, and means for driving the cam, said driving means including means for synchronizing the cam action with the passing of a conductor by a marked point on the sector plate.

14. In a testing device for ignition timer cams, the combination of means for supporting a cam to turn about its own axis, a circuit breaker adapted to be operated by the cam, means for indicating sparking timing and including a distributor plate carrying pointed conductors cooperating with a stationary graduated sector plate, said distributor plate rotating coaxially with the cam, and means for driving the cam, said driving means including means for orienting the cam so as to establish a definite relationship between the cam lobes and the distributor plate.

15. In a testing device for ignition timer cams, the combination of means for supporting a cam to turn about its own axis, a circuit breaker adapted to be operated by the cam, means for indicating sparking timing and including a distributor plate carrying pointed conductors cooperating with a stationary graduated sector plate, said distributor plate rotating coaxially with the cam, means for driving the cam, said driving means including means for orienting the cam so as to establish a definite relationship between the cam lobes and the distributor plate, means for moving the circuit breaker concentrically of the axis of the cam into any desired angular position relative thereto, and means for arresting the circuit breaker in any desired angular position relative to the cam.

16. In a testing device for ignition timer cams, the combination of means for supporting a cam to turn about its own axis, a circuit breaker adapted to be operated by the cam, a spark timing indicator including an index member and a scale member one of which is stationary and the other rotatable coaxially with the cam, and means for driving the cam, said driving means including means for synchronizing the cam action with the relative passing of the index member by a marked point on the scale member.

17. In a testing device for ignition timer cams, the combination of means for supporting a cam to turn about its own axis, a circuit breaker adapted to be operated by the cam, a spark timing indicator including an index member and a scale member one of which is stationary and the other rotatable coaxially with the cam, and means for driving the cam, said driving means including means for orienting the cam so as to establish a definite relationship between the cam lobes and the rotatable member.

18. In a testing device for ignition timer cams, the combination of means for supporting a cam to turn about its own axis, a circuit breaker adapted to be operated by the cam, a spark timing indicator including an index member and a scale member one of which is stationary and the other rotatable coaxially with the cam, means for driving the cam, said driving means including means for orienting the cam so as to establish a definite relationship between the cam lobes and the rotatable member, means for moving the circuit breaker concentrically of the axis of the cam into any desired angular position relative thereto, and means for arresting the circuit breaker in any desired angular position relative to the cam.

19. In a testing device for ignition timer cams the combination of means for supporting a cam to turn about its own axis, a circuit breaker adapted to be operated by the cam, a spark timing indicator including an index member and a scale member one of which is stationary and the other rotatable coaxially of and in response to rotation of the cam, and means for driving the cam, said driving means including means for orienting the cam so as to establish a definite relationship between the cam lobes and the rotating member.

20. In a testing device for ignition timer cams, the combination of means for supporting a cam to turn about its own axis, a circuit breaker adapted to be operated by the cam, a spark timing indicator including an index member and a scale member one of which is stationary and the other rotatable coaxially of and in response to rotation of the cam, means for driving the cam, said driving means including means for orienting the cam so as to establish a definite relationship between the cam lobes and the rotatable member, means for moving the circuit breaker concentrically of the axis of the cam into any desired angular position relative thereto, and means for arresting the circuit breaker in any desired angular position relative to the cam.

21. In a testing device for ignition timer cams, the combination of means for supporting a cam to turn about its own axis, a circuit breaker adapted to be operated by the cam, means for indicating sparking timing and including a distributor plate carrying pointed conductors cooperating with a stationary graduated sector plate, said distributor plate rotating coaxially of and in response to rotation of the cam, and means for driving the cam, said driving means including means for orienting the cam so as to establish a definite relationship between the cam lobes and the distributor plate.

22. In a testing device for ignition timer cams, the combination of means for rotatably supporting a cam to turn about its own axis, a circuit breaker having cooperating contacts and a movable cam operated member for separating the contacts, means for indicating sparking timing and including a distributor plate carrying pointed conductors cooperating with a stationary graduated sector plate, said distributor plate rotating coaxially of and in response to rotation of the cam, and means for driving the cam, said driving means including means for synchronizing the cam action with the passing of a pointed conductor by a marked point on the sector plate.

23. In a testing device for ignition timer cams, the combination of means for rotatably supporting a cam to turn about its own axis, a circuit breaker having cooperating contacts and a movable cam operated member for separating the contacts, a spark timing indicator including an index member and a scale member one of which is stationary and the other rotatable coaxially of and in response to rotation of the cam, and means for driving the cam, said driving means including means for synchronizing the cam action with the relative passing of the index member by a marked point on the scale member.

24. In a testing device for ignition timer cams, the combination of means for rotatably supporting a cam to turn about its own axis, a circuit breaker having cooperating contacts and a movable cam operated member for separating the contacts, a spark timing indicator including an index member and a scale member one of which is stationary and the other rotatable coaxially of and in response to rotation of the cam, means for driving the cam, said driving means including means for synchronizing the cam action with the relative passing of the index member by a marked point on the scale member, means for moving the circuit breaker concentrically of the axis of the cam into any desired angular position relative thereto, and means for arresting the circuit breaker in any desired angular position relative to the cam.

25. In a testing device for ignition timer cams, the combination of a stationary means, a first means detachably carried by the stationary means for supporting a cam for rotation about its own axis, a circuit breaker having cooperating contacts and a movable cam operated member for separating the contacts, a movable plate carrying the circuit breaker for bodily radial movement relative to the cam, a spark timing indicator including an index member and a scale member one of which is stationary and the other rotatable coaxially with the cam, a second means detachable from and rotatably supported by said first detachable means for drivingly connecting the cam with the second detachable means and for synchronizing the cam action with the relative passing of the index member by a marked point on the scale member, driving means adapted to engage any applied second detachable means, means for indicating the movement of the member relative to the plate to effect a predetermined separation of the contacts, means for adjusting the plate relative to the cam to effect a predetermined separation of the contacts by the cam being tested, means for indicating movement of the plate, and means for angularly adjusting the plate relative to the cam.

26. A testing device for ignition timer cams comprising, in combination, a stationary shaft, a pin detachably carried by said shaft for rotatably supporting a cam, a circuit breaker having cooperating contacts and a movable cam operated member for separating the contacts, a movable plate carrying the circuit breaker for bodily radial movement relative to the cam, a spark timing indicator including an index member and a scale member, one of which is stationary and the other rotatable coaxially with the cam, means detachable from and rotatably supported by the pin and having a projecting lug engaging a correspondingly formed notch in the cam for drivingly connecting the cam with said means and for synchronizing the cam action with the relative passing of the index member by a marked point on the scale member, driving means adapted to engage any applied detachable means, means for indicating movement of the member relative to the plate to effect a predetermined separation of the contacts, means for adjusting the plate relative to the cam to effect a predetermined separation of the contacts by the cam being tested, means for indicating movement of the plate relative to the cam, and means for angularly adjusting the plate relative to the cam.

LEO C. SHIPPY.